Dec. 21, 1943.  P. SEEBER  2,337,209
SEED TREATING MACHINE
Filed April 23, 1942  4 Sheets-Sheet 1
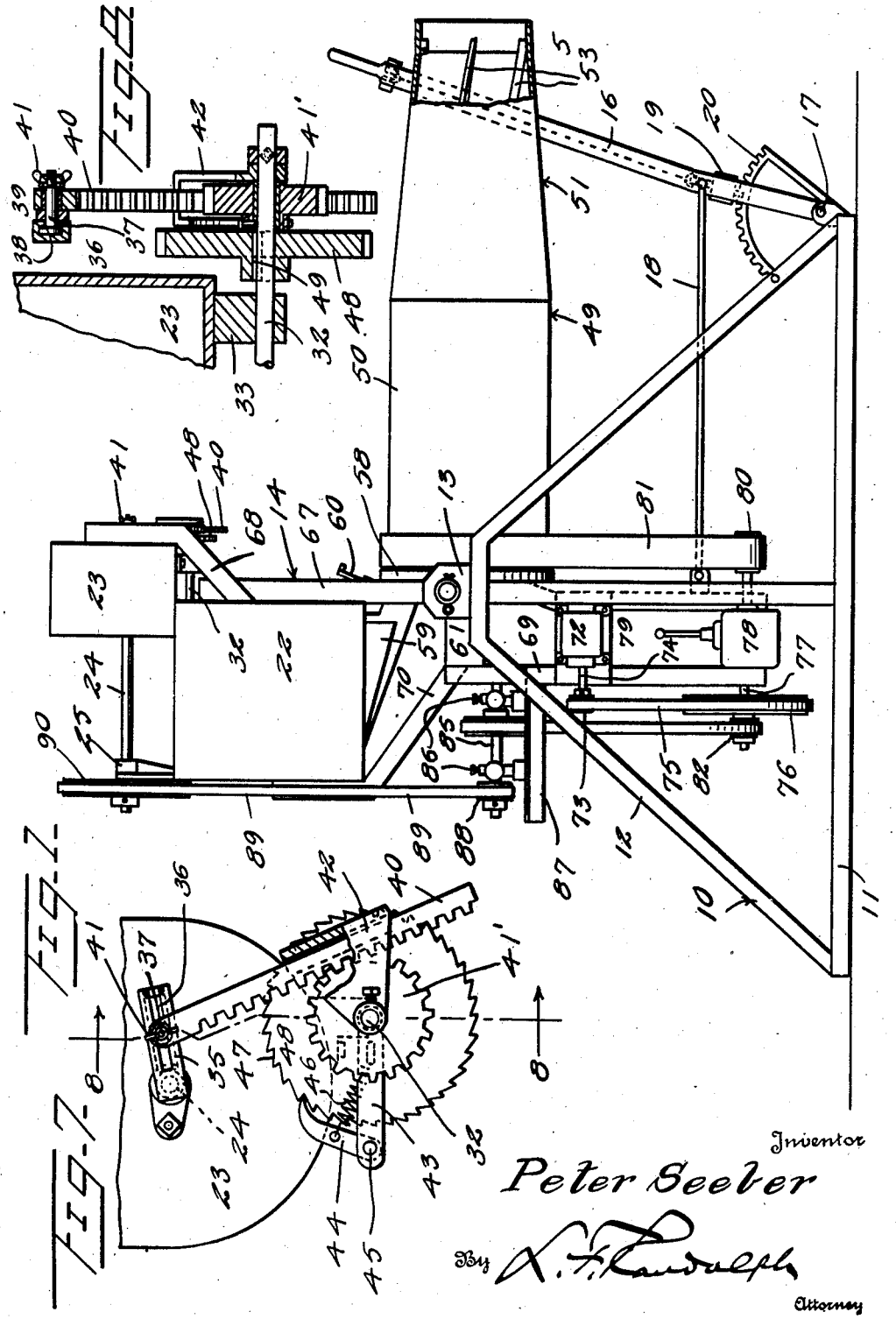
Inventor
Peter Seeber
By L. F. Randolph
Attorney Dec. 21, 1943.    P. SEEBER    2,337,209
SEED TREATING MACHINE
Filed April 23, 1942    4 Sheets-Sheet 2
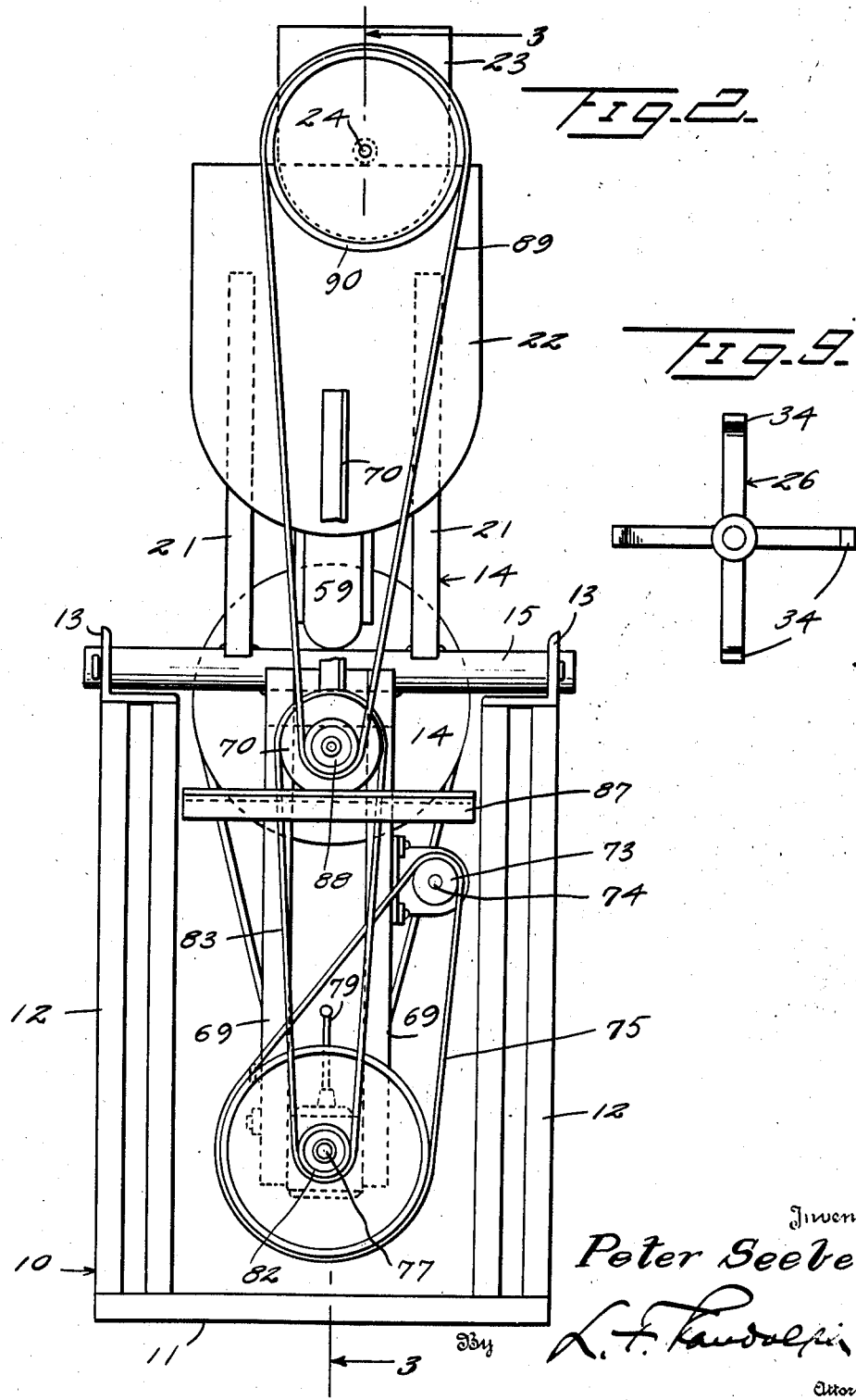
Inventor
Peter Seeber

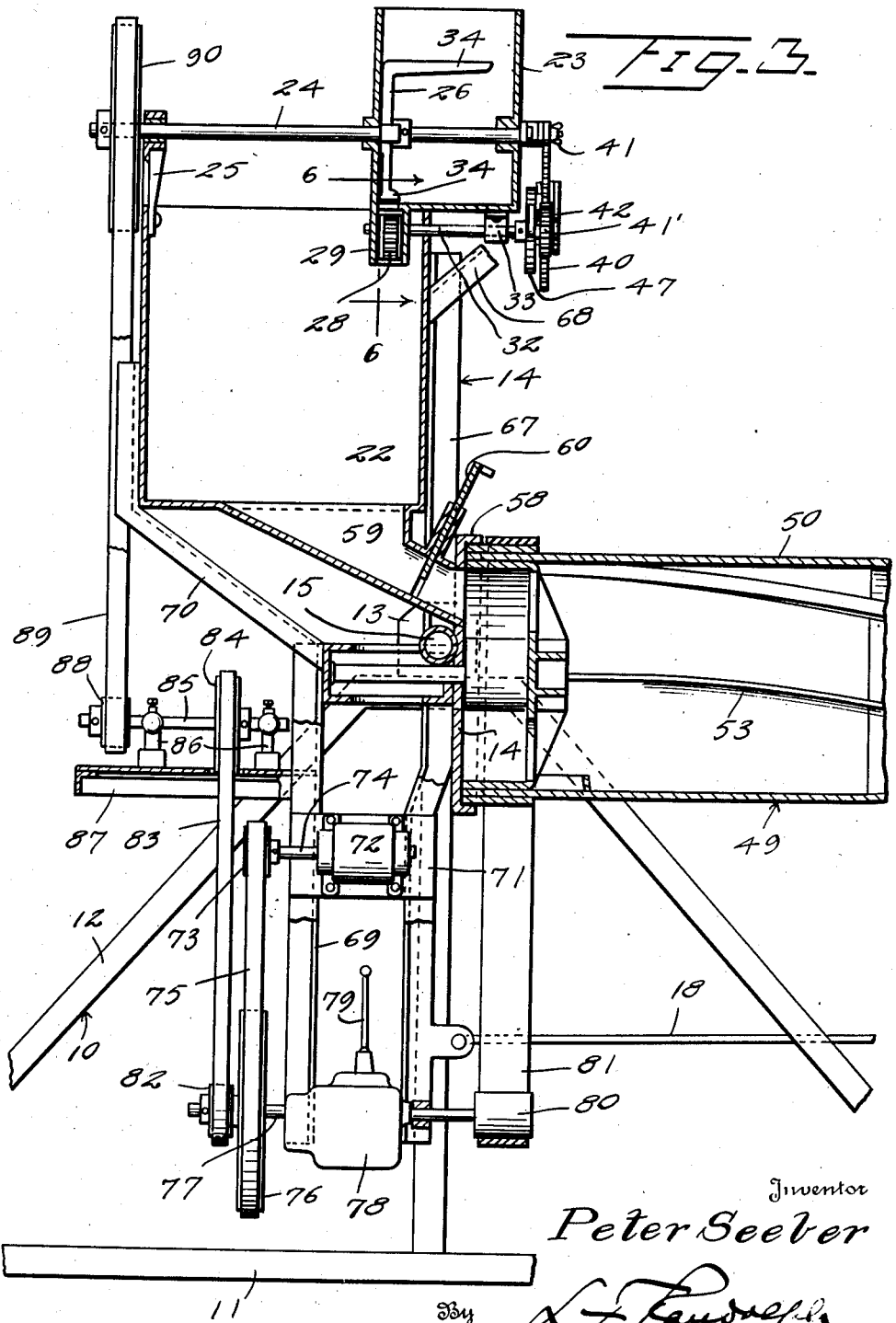

Dec. 21, 1943.                P. SEEBER                    2,337,209
                        SEED TREATING MACHINE
                     Filed April 23, 1942        4 Sheets-Sheet 4
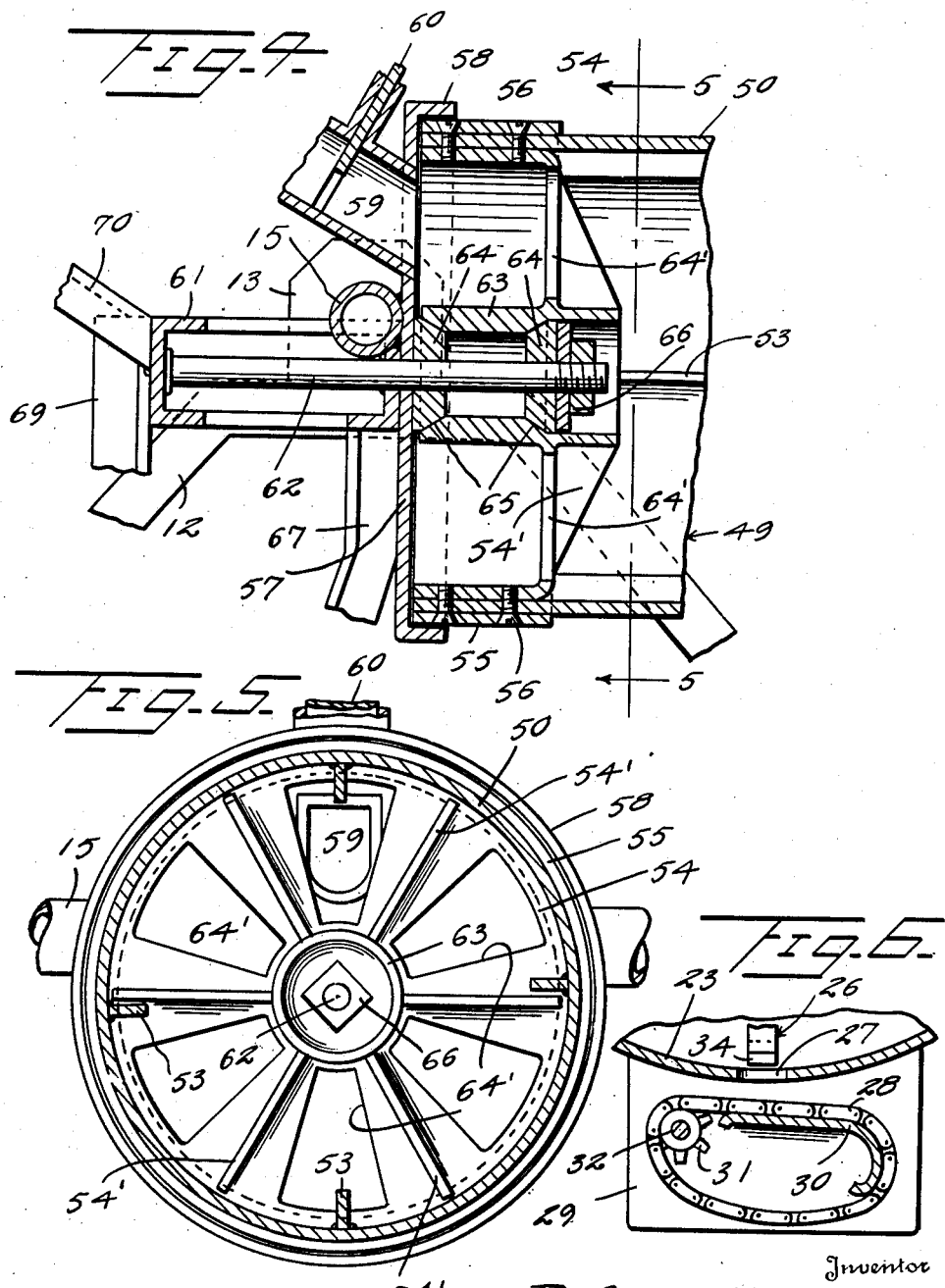
Inventor
Peter Seeber
Attorney Patented Dec. 21, 1943

2,337,209

UNITED STATES PATENT OFFICE 2,337,209

SEED TREATING MACHINE

Peter Seeber, Champaign, Ill.

Application April 23, 1942, Serial No. 440,261

5 Claims. (Cl. 259—3)

This invention relates to a machine for the treatment of seed with a disinfectant in dust form so that the seed when planted may germinate in more healthy surroundings.

I particularly aim to provide such a machine wherein a disinfectant dust is efficiently mixed with the seed to thoroughly coat the latter and a machine which is capable of being tilted as a whole to regulate the output and to facilitate expeditious emptying especially when dusting different kinds of seed.

In addition, I aim to provide a novel, relatively simple, durable, and inexpensive construction capable of motor operation under variable speed control.

Another object is to provide such a construction wherein the feed of the dust to seed is positive but capable of regulation in a novel manner, and a construction wherein the supply of seed and dust to a mixer is under valve control and which mixer has novel lifting vanes or flights and a constricted outlet portion.

The more specific objects and advantages will become apparent from a consideration of the description following taken in connection with accompanying drawings illustrating an operative embodiment.

In said drawings:

Figure 1 is a view of the machine in side elevation;

Figure 2 is a front end elevation of the machine;

Figure 3 is a vertical sectional view taken approximately on the line 3—3 of Figure 2;

Figure 4 is an enlarged section showing the mounted mounting for the mixer and the inner end portion of the latter and associated parts;

Figure 5 is a cross section taken on the plane of line 5—5 of Figure 4;

Figure 6 is a detail section taken on the line 6—6 of Figure 3;

Figure 7 is an enlarged detail elevation looking toward the rear of the dust hopper;

Figure 8 is a section taken approximately on the line 8—8 of Figure 7, and

Figure 9 is an end view of the agitator.

Referring specifically to the drawings wherein like reference characters designate like or similar parts, a relatively stationary mounting frame is provided at 10 having a base 11 with approximately triangular sides 12 with bearings 13 at the tops thereof.

A machine frame generally designated 14, of which a transverse shaft 15, forms a part, is journaled in the bearings 13, to the end that the machine frame may be tilted on the axis of shaft 15 and secured in different adjusted positions, as through the operation of a lever 16, pivoted at 17 to the mounting frame 10 and having a link 18 pivoted both to the machine frame 14 and to the lever. The lever also has a conventional lock mechanism at 19 to coact with the teeth of a segment 20 fastened to the mounting frame 10.

The constituent parts of the machine frame may be secured together in any suitable manner. They are usually metallic, skeletonized and integral with each other or welded together. Such frame 14 may have uprights 21 extending from shaft 15 and mounting a seed hopper 22 which for the most part is open at the top in order that seed may be supplied thereto either manually or by machine as preferred.

Straddling the upper edge of the rear wall of seed hopper 22 as best appears in Figures 1 and 3, is a disinfectant or dust hopper 23 which, it will be noted, is open at the top so that the disinfectant or dust may be supplied thereto. A shaft 24 is rotatably mounted in walls of the hopper 23 and in a bearing 25 secured to the seed hopper 22. An agitator 26 is rigid on shaft 24 and operates within the dust hopper 23 to promote the discharge of dust from hopper 23 through an opening 27 in the bottom thereof onto an endless conveyor or distributor 28 disposed relatively close thereto and beneath the same and operable between depending walls 29 on the dust hopper 23 but located within the seed hopper 22. The element 28 may be a chain as shown and it traverses a fixed guide 30 which spans the walls 29 and also traverses a sprocket wheel 31 keyed to a shaft 32 which is journaled in the walls 29 and in a bearing 33 on the bottom wall of hopper 23.

The aforesaid agitator 26 may be of any suitable construction but it preferably has longitudinally extending arms 34 of different lengths. The amount of dust or disinfectant discharging through opening 27 onto the conveyor 28 and discharged by the latter into the hopper 22 is variable through control of the speed of the shaft 32, as best shown in Figures 3, 7 and 8. To this end, a crank 35 is provided on shaft 24 and has an elongated slot 36 therethrough. A bolt 37 has a head 38 anchored and slidably adjustable in slot 36 on which bolt a nut 39 is screw threaded to bind against the crank to hold the bolt in different adjusted position. A rack bar 40 is pivoted on bolt 37 and held against accidental detachment by a wing nut 41.

The teeth of rack bar 40 enmeshed with the teeth of a gear wheel 41' loose on the shaft 32. A U-shaped bracket 42 surrounds the rack 40 to hold it in place and through openings in the terminals of the bracket, shaft 32 passes in order to mount such bracket. An arm 43 fast to the gear wheel 41 has a pawl 44 pivoted thereto at 45 which is urged by a contractile spring 46 fastened thereto and to the arm 42 into coacting engagement with the teeth 47 of a ratchet wheel 48 keyed at 49 to the shaft 32. As a result, the throw of the rack bar 40 is adjustable by varying the position of the bolt 37 and through this adjustment, the operation of shaft 32 through the gear and ratchet mechanism, varies the movement of the conveyor or distributor 28 accordingly.

A mixer structure 49 is provided for the seed and dust or disinfectant. This mixer consists of a horizontally disposed rotatable drum 50 which has a tapered portion 51 leading, approximately midway thereof, to the discharge end which is constricted as a result and for a short distance at 52 of the same diameter throughout. Such discharge end is open and interiorally of the drum, ribs or flights 53 extend inwardly from the wall in order to lift the material being mixed and thus more thoroughly mixed or agitated.

Interiorally of the mixing drum at the inner end portion is a head generally designated 54 and exteriorly of such drum opposed to the cage is a collar 55, screws 56 being used to secure the head and collar to the drum. Integral with head 54 are interior radial blades 54' which aid in the mixing of seed and dust as well as to propel the same through openings 64. Frame 14 has a cap plate 57 which is stationary but in closing relation to the inner end of the drum, preferably having an annular flange 58, surrounding the ring or collar 55. A chute 59 communicates with the bottom of the hopper 22 and leads to the interior of head 54, through the cap wall 57 so that the mixture of seed and dust or disinfectant may travel from hopper 22 into the mixer. Such travel, however, regulable as to quantity and flow through the medium of a slide valve 60 or its equivalent mounted in any conventional manner in the chute 59.

Frame 14 adjacent the shaft 15 has an open mounting 61 in order to mount a fixed horizontally disposed shaft 62 which extends therefrom through and beyond the cap plate 57 and into the head 54. Head 54 has a hub at 63 and outwardly thereof has openings 64 so that the mixture may pass into the head through the open inner end of the latter and from the same through openings 64 into the cylinder 50. Interiorally of the hub 63, any suitable bearings, which may be ball or taper bearing devices, 64 rotatably mount the head 54 and cylinder on the shaft 62, the bearings engaging the hub along oppositely inclined surfaces 65 and bearings being held in place together with the cylinder and head, through the medium of nuts 66 screwed on the shaft 62. As a result, the mixture of seed and dust will pass from the hopper 22 through the chute 59 into the head 54 and cylinder 51, being effectively mixed through the rotation of the cylinder. It will be realized that the capacity and speed of discharge from the mixer 51 will be regulated by tilting the machine through manipulation of the lever 16, and, also, that the machine or mixer may be emptied by tilting the same through the action of the same lever 16 which is highly desirable, where different seeds are to be mixed with the same dust and in succession.

The machine frame 14 includes an upright 67 which is in supporting relation to the hopper 22. A brace or bar 68 extends from the upright 14 to the hopper 23. Secured to the mounting 61 and parallel to the upright or bar 67 is another upright or bar 69 from the top of which a bar or brace 70 extends and is fastened to the hopper 22. Bars 67 and 69 mount a base plate 71 for an operating motor 72 which is preferably an electric motor. Motor 72 has a pulley 73 on its main shaft 74 which is traversed by a belt 75 also traversing a pulley 76 on a shaft 77 in sections, including a variable speed mechanism 78, mounted on the bars 67 and 69 and which is manually controlled through shifting of a lever 79. Shaft 77 also has a pulley 80 thereon traversed by a belt 81 which also traverses a collar 65 and thereby rotates a drum 50 of the mixer and parts carried thereby.

Shaft 77 also has a pulley 82 keyed thereto traversed by a belt 83 which passes over a pulley 84 on a shaft 85 journaled in suitable bearings 86 on a shelf 87 suitably supported by the bars 69. Shaft 85 through the medium of a pulley 88 thereon and belt 89 traversing the same, drives a pulley 90 which is keyed to the previously mentioned shaft 24 in order to operate the latter.

It will be understood that in lieu of the driving belts and pulleys, I may use any other driving, gearing or the equivalent.

Various other changes may be resorted to provided they fall within the spirit and scope of the invention as hereinafter defined by the appended claims.

I claim as my invention:

1. A machine of the class described having a frame, and a mixer on said frame, said mixer having a rotatable cylinder, a fixed shaft on said frame, a plate on said frame to close the inner end of the cylinder, said plate having an opening therethrough for supply of material to the cylinder, a head within the cylinder journaled on said shaft, said head having a blade to propel material therethrough and being open to communicate with the interior of the cylinder.

2. A machine of the class described having a mounting means, a frame rotatably mounted thereon, and a mixer on said frame, said mixer having a rotatable cylinder, a fixed shaft on said frame, a plate on said frame to close the inner end of the cylinder, said plate having an opening therethrough for supply of material to the cylinder, a head within the cylinder journaled on said shaft, said head having blades to propel the material therethrough and also having openings leading therefrom to the interior of the cylinder.

3. A machine of the class described having a mounting means, a frame rotatably mounted thereon, and a mixer on said frame, said mixer having a rotatable cylinder, a fixed shaft on said frame, a plate on said frame to close the inner end of the cylinder, said plate having an opening therethrough for supply of material to the cylinder, a head within the cylinder journaled on said shaft, said head having blades to propel the material therethrough and also having openings leading therefrom to the interior of the cylinder, a collar surrounding the cylinder, fastenings securing the head and collar to the cylinder, and driving means for the cylinder engageable with the collar.

4. A machine of the class described having a mounting means, a frame rotatably mounted thereon, and a mixer on said frame, said mixer having a rotatable cylinder, a fixed shaft on said frame, a plate on said frame to close the inner end of the cylinder, said plate having an opening therethrough for supply of material to the cylinder, a head within the cylinder journaled on said shaft, said head having blades to propel the material therethrough and also having openings leading therefrom to the interior of the cylinder, a collar surrounding the cylinder, fastenings securing the head and collar to the cylinder, and driving means for the cylinder engageable with the collar, said plate having a flange surrounding the collar, said hub having oppositely disposed bearing surfaces and bearing elements mounted by the shaft engaging said surfaces.

5. A machine of the class described having mounting means, a frame pivoted on said mounting means, said frame including a plate, a shaft fixed on said frame and extending beyond and through the plate, a mixer journaled on said shaft beyond the plate, said plate having an opening therethrough for the supply of material to the mixer, bearing means interiorly of the mixer mounted on the shaft and having an opening therethrough for communication with the interior of the mixer, a structure on said frame on the opposite side of its axis of rotation to the mixer, a motor mounted on said structure below said axis, drive means from the motor disposed below the same, and a drive from the last-mentioned means to the mixer to rotate the same.

PETER SEEBER.